(12) United States Patent
Hassman et al.

(10) Patent No.: US 10,460,368 B2
(45) Date of Patent: Oct. 29, 2019

(54) SYSTEM FOR PRESENTING AND UPDATING A CONTEXTUAL VISUALIZATION OF MULTIPLE PRODUCTS INSTALLED IN AN INSTALLATION LOCATION FOR MULTIPLE USERS

(71) Applicant: PELLA CORPORATION, Pella, IA (US)

(72) Inventors: Rick Hassman, Altoona, IA (US); Ryan Davis, Pella, IA (US)

(73) Assignee: Pella Corporation, Pella, IA (US)

( * ) Notice: Subject to any disclaimer, the term of this patent is extended or adjusted under 35 U.S.C. 154(b) by 1078 days.

(21) Appl. No.: 14/788,718

(22) Filed: Jun. 30, 2015

(65) Prior Publication Data
US 2017/0004552 A1  Jan. 5, 2017

(51) Int. Cl.
G06Q 30/06 (2012.01)
G06Q 10/10 (2012.01)
G06F 3/0482 (2013.01)
G06F 3/0484 (2013.01)

(52) U.S. Cl.
CPC ....... *G06Q 30/0611* (2013.01); *G06F 3/0482* (2013.01); *G06F 3/04842* (2013.01); *G06Q 10/1095* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,859,768 B1 * | 2/2005 | Wakelam | G06F 17/5004 703/1 |
| 7,634,103 B2 | 12/2009 | Rubinstenn et al. | |
| 8,498,456 B2 | 7/2013 | Legagneur et al. | |
| 9,734,634 B1 * | 8/2017 | Mott | G06T 19/006 |
| 2002/0010655 A1 * | 1/2002 | Kjallstrom | G06Q 30/02 705/26.62 |
| 2011/0106650 A1 * | 5/2011 | Stone | G06Q 10/087 705/26.5 |
| 2013/0103549 A1 | 4/2013 | Hilliard et al. | |
| 2013/0262167 A1 | 10/2013 | Masood et al. | |

(Continued)

FOREIGN PATENT DOCUMENTS

WO  WO9961977 A1  12/1999

OTHER PUBLICATIONS

Du, Hao, et al. "Interactive 3D modeling of indoor environments with a consumer depth camera." Proceedings of the 13th international conference on Ubiquitous computing. ACM, 2011 (Year: 2011).*

*Primary Examiner* — Marissa Thein
*Assistant Examiner* — Michelle T Kringen
(74) *Attorney, Agent, or Firm* — Faegre Baker Daniels LLP

(57) ABSTRACT

Methods and systems are provided for facilitating a home-improvement product purchasing experience by facilitating contextual visualizations in which images of currently available products are shown as being installed in an installation location associated with a potential customer's property. The currently available product information is maintained in a quoting database that is also used to generate product quotes, including current prices. A portable device may include an imaging device and may instantiate a visualizer to facilitate viewing contextual visualizations of product locations on-site.

6 Claims, 11 Drawing Sheets

(56) References Cited

U.S. PATENT DOCUMENTS

2013/0268388 A1* 10/2013 Walker .............. G06Q 30/0611
705/26.4
2014/0100997 A1 4/2014 Mayerle et al.
2014/0214473 A1* 7/2014 Gentile ............ G06Q 10/06313
705/7.23
2015/0325038 A1* 11/2015 Baker ................ H04N 13/0007
345/426

* cited by examiner

SYSTEM FOR PRESENTING AND UPDATING A CONTEXTUAL VISUALIZATION OF MULTIPLE PRODUCTS INSTALLED IN AN INSTALLATION LOCATION FOR MULTIPLE USERS

BACKGROUND

Conventional home-improvement product sales utilize websites that facilitate viewing a depiction of a product before purchasing and/or on-site sales activities during which a salesperson may help identify appropriate projects and show, to a potential customer, images of products that are sometimes available.

SUMMARY

In an Example 1, A system for facilitating a dynamic home-improvement shopping experience, the system comprises a memory device comprising a quoting database, the quoting database comprising a list of currently available products, a list of currently available product features, and at least one current price corresponding to each of the currently available products; and a server configured to provide a service, the service configured to: obtain, from the quoting database, the list of currently available products, wherein the currently available products comprise products that are available for purchase as of the time that the server obtains the list of currently available products from the quoting database; provide, to a user device, the list of currently available products, wherein the user device provides a graphical user interface (GUI) that presents the list of currently available products to a first user; receive, from the user device, an indication of a first selected product, wherein the first selected product comprises a first product selected, via the GUI, by the first user from the list of currently available products; create a project file associated with the first user, wherein the project file comprises an indication of the first selected product; save the project file on a memory device; and provide the project file to a quoting component, wherein the quoting component is configured to (1) reference the quoting database to determine a current price corresponding to the first selected product, wherein the current price comprises a price that is valid as of the time that the quoting component references the quoting database; and (2) generate a first product quote, the first product quote comprising the price corresponding to the first selected product, wherein the price comprises at least one of a materials price, a delivery price, and an installation price.

In an Example 2, the system of Example 1 is provided, wherein the user device comprises a portable device, the portable device comprising: an imaging device configured to capture a digital image of a scene, wherein the scene comprises a portion of a structure that includes an installation location for installation of a home-improvement product; and a processor that instantiates at least one component stored in a memory, the at least one component comprising a visualizer, wherein the visualizer is configured to: receive the digital image of the scene; receive an image file corresponding to the first selected product; and present, using the image file corresponding to the first selected product and the digital image of the scene, a contextual visualization of the first selected product, wherein the contextual visualization comprises an image depicting the first selected product installed in the installation location.

In an Example 3, the system of any of Examples 1 and 2 is provided, wherein the visualizer is configured to: receive, via the GUI, a selection of at least one of a second product and a product feature; and present, in response to receiving the selection, a contextual visualization of the second selected product and/or the product feature.

In an Example 4, the system of any of Examples 2 and 3 is provided, wherein the contextual visualization comprises a three-dimensional image.

In an Example 5, the system of any of Examples 2-4 is provided, wherein the visualizer is further configured to: determine, based on the digital image of the scene, dimensions of the installation location; and provide the determined dimensions to the server, wherein the price included in the first product quote corresponds to a product feature of the list of currently available product features, the product feature comprising a dimensional configuration of the first selected product, wherein the dimensional configuration comprises a set of dimensions of the first selected product that are selected, based on the determined dimensions, such that the first selected product having the dimensional configuration is sized to fit the installation location.

In an Example 6, the system of any of Examples 1-5 is provided, wherein the server comprises a web server and the service comprises a web service.

In an Example 7, the system of any of Examples 1-6 is provided, wherein the visualizer comprises a client application communicably coupled to a server application, wherein the server application is hosted by the server.

In an Example 8, the system of any of Examples 1-7 is provided, wherein the server is further configured to: create an updated project file by updating the project file to include the at least one of a second selected product and a selected product feature; provide the updated project file to the quoting component, wherein the quoting component is configured to generate a second product quote, the second product quote comprising a price corresponding to the at least one of the second selected product and the selected product feature, wherein the price comprises at least one of a materials price, a delivery price, and an installation price; receive the second product quote from the quoting component; and provide the second product quote to the user device.

In an Example 9, the system of any of Examples 1-8 is provided, further comprising a scheduling component configured to: receive, from the server, an indication of the first product quote; reference calendar information corresponding to at least one representative; and schedule, based on the calendar information, an appointment.

In an Example 10, a system for facilitating a dynamic home-improvement shopping experience, the system comprises a portable device comprising: an imaging device configured to capture a digital image of a scene, wherein the scene comprises a portion of a structure that includes an installation location for installation of a home-improvement product; and a processor that instantiates at least one component stored in a memory, the at least one component comprising a visualizer, wherein the visualizer is configured to receive the digital image of the scene from the imaging device; and a server communicably coupled to the portable device, the server configured to: obtain a list of currently available products from a quoting database, the quoting database comprising the list of currently available products, a list of currently available product features, and at least one current price corresponding to each of the currently available products, wherein the currently available products comprise products that are available for purchase as of the time that the server obtains the list of currently available products from the quoting database; provide, to the visualizer, the list of currently available products, wherein the visualizer provides a first graphical user interface (GUI) that presents the list of currently available products to a first user; receive, from the visualizer, an indication of a first selected product, wherein the first selected product comprises a first product selected, via the first GUI, by the first user from the list of currently available products; create a project file associated with the first user; save the project file on a memory device; and provide, to the visualizer, an image file corresponding to the first selected product, wherein the visualizer is configured to use the image file corresponding to the first selected product to present a contextual visualization of the first selected product, wherein the contextual visualization comprises an image depicting the first selected product installed in the installation location.

In an Example 11, the system of Example 10 is provided, wherein the visualizer is further configured to: receive, via the GUI, a selection of at least one of a second product and a product feature; and present, in response to receiving the selection, a contextual visualization of the second selected product and/or the product feature.

In an Example 12, the system of any of Examples 10 and 11 is provided, wherein the contextual visualization comprises a three-dimensional image.

In an Example 13, the system of any of Examples 10-12 is provided, wherein the visualizer is further configured to: determine, based on the digital image of the scene, dimensions of the installation location; and provide the determined dimensions to the server, wherein the price included in the first product quote corresponds to a product feature of the list of currently available product features, the product feature comprising a dimensional configuration of the first selected product, wherein the dimensional configuration comprises a set of dimensions of the first selected product that are selected, based on the determined dimensions, such that the first selected product having the dimensional configuration is sized to fit the installation location.

In an Example 14, the system of any of Examples 10-13 is provided, further comprising a quoting component configured to: reference the quoting database to determine a current price corresponding to the first selected product, wherein the current price comprises a price that is valid as of the time that the quoting component references the quoting database; and generate a first product quote, the first product quote comprising the price corresponding to the first selected product, wherein the price comprises at least one of a materials price, a delivery price, and an installation price.

In an Example 15, the system of any of Examples 10-14 is provided, wherein the server is further configured to provide a web service, the web service configured to: provide a second GUI, the second GUI providing access to the project file to a second user; receive an indication of at least one of a second selected product and a selected product feature; create an updated project file by updating the project file to include at least one of a second selected product and a selected product feature; provide the updated project file to the quoting component, wherein the quoting component is configured to generate a second product quote, the second product quote comprising a price corresponding to the at least one of the second selected product and the selected product feature, wherein the price comprises at least one of a materials price, a delivery price, and an installation price; receive the second product quote from the quoting component; and provide the second product quote to the second user.

In an Example 16, the system of any of Examples 10-15 is provided, wherein the first user comprises a salesperson and the second user comprises a consumer.

In an Example 17, the system of any of Examples 10-16 is provided, further comprising a scheduling component configured to: receive, from the server, an indication of the first product quote; reference calendar information corresponding to at least one representative; and schedule, based on the calendar information, an appointment.

In an Example 18, a computer-implemented method for facilitating a dynamic home-improvement shopping experience comprises: obtaining, using a server, a list of currently available products from a quoting database, wherein the currently available products comprise products that are available for purchase as of the time that the server obtains the list of currently available products from the quoting database; providing, to a user device, the list of currently available products, wherein the user device provides a graphical user interface (GUI) that presents the list of currently available products to a user; receiving, from the user device, an indication of a first selected product, wherein the first selected product comprises a first product selected, via the first GUI, by the first user from the list of currently available products; creating a project file associated with the first user, wherein the project file comprises an indication of the first selected product; and providing the project file to a quoting component, wherein the quoting component is configured to (1) reference the quoting database to determine a current price corresponding to the first selected product, wherein the current price comprises a price that is valid as of the time that the quoting component references the quoting database; and (2) generate a first product quote, the first product quote comprising the price corresponding to the first selected product, wherein the price comprises at least one of a materials price, a delivery price, and an installation price.

In an Example 19, the method of Example 18 is used, wherein the user device comprises a portable device having an imaging device communicably coupled thereto, wherein the portable device instantiates at least one component, the at least one component comprising a visualizer, the method further comprising: receiving, from the visualizer, an indication of the first selected product; and providing, to the visualizer, an image file corresponding to the first selected product, wherein the visualizer is configured to use the image file corresponding to the first selected product to present a contextual visualization of the first selected product, wherein the contextual visualization comprises an image depicting the first selected product installed in the installation location.

In an Example 20, the method of Example 19 is used, further comprising: receiving, from the visualizer, a selection of at least one of a second product and a product feature; and providing, to the visualizer, in response to receiving the selection, an image file corresponding to the at least one of the second product and the product feature, wherein the visualizer is configured to use the image file corresponding to the at least one of the second product and the product feature to present, in response to receiving the selection of the at least one of the second product and the product feature, a contextual visualization of the at least one of the second product and the product feature, wherein the contextual visualization comprises an image depicting the at least one of the second product and the product feature installed in the installation location.

In an Example 21, the method of any of Examples 19 and 20 is used, wherein the contextual visualization comprises a three-dimensional image.

In an Example 22, the method of any of Examples 19-21 is used, further comprising: receiving, from the visualizer, a set of determined dimensions of the installation location; and providing the set of determined dimensions to the quoting component, wherein the price included in the first product quote corresponds to a product feature of the list of currently available product features, the product feature comprising a dimensional configuration of the first selected product, wherein the dimensional configuration comprises a set of dimensions of the first selected product that are selected, based on the determined dimensions, such that the first selected product having the dimensional configuration is sized to fit the installation location.

In an Example 23, the method of any of Examples 18-22 is used, further comprising: creating an updated project file by updating the project file to include at least one of a second selected product and a selected product feature; providing the updated project file to the quoting component, wherein the quoting component is configured to generate a second product quote, the second product quote comprising a price corresponding to the at least one of the second selected product and the selected product feature, wherein the price comprises at least one of a materials price, a delivery price, and an installation price; receiving the second product quote from the quoting component; and providing the second product quote to the user device.

Figure 1:
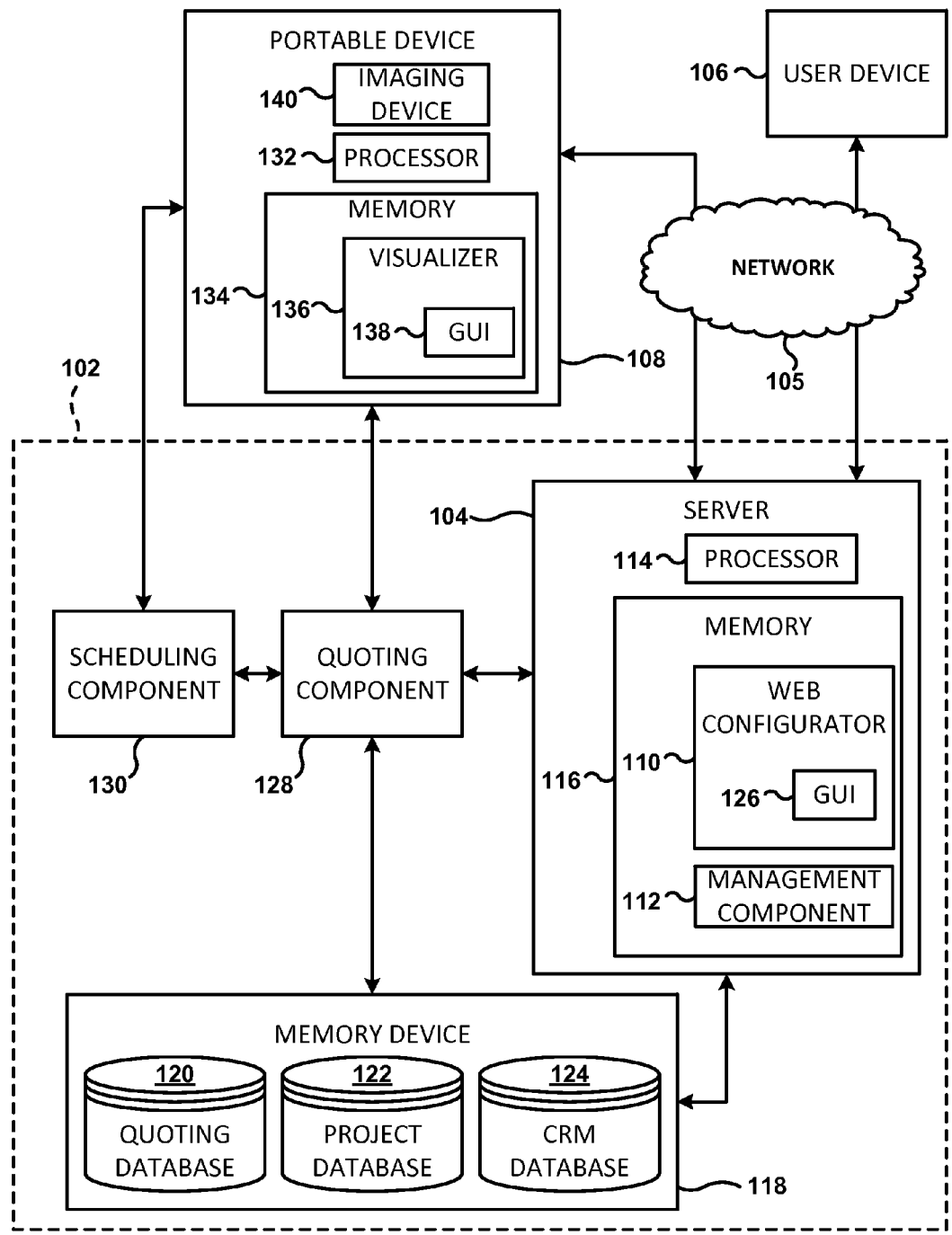
FIG. 1 is a block diagram illustrating an operating environment (and, in some embodiments, aspects of the present invention), in accordance with embodiments of the disclosure.

While the disclosed subject matter is amenable to various modifications and alternative forms, specific embodiments have been shown by way of example in the drawings and are described in detail below. The present disclosure, however, is not limited to the particular embodiments described. On the contrary, the disclosed subject matter is intended to cover all modifications, equivalents, and alternatives falling within the ambit of the present disclosure as defined by the appended claims.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

FIG. 1 depicts an example of an operating environment 100, in accordance with embodiments of the subject matter disclosed herein. As shown in FIG. 1, the operating environment 100 includes a home-improvement servicing platform 102 that includes a server 104 that interacts, via a network 105, with a user device 106 and a portable device 108. In embodiments, the user device 106 and the portable device 108 may be the same device, and/or there may be any number of user devices 106 and/or portable devices 108. The network 105 may be, or include, any number of different types of communication networks such as, for example, a short messaging service (SMS), a local area network (LAN), a wireless LAN (WLAN), a wide area network (WAN), the Internet, or the like. According to embodiments, the server 104 implements a web configurator 110 that is configured to provide an online home improvement shopping experience in which users are able to view images of currently available products, view images of product features, order products, and/or the like. The server 102 also implements a management component 112 that is configured to facilitate interactions between a user device 106 and/or a portable device 108 and the system 102.

As shown in FIG. 1, the server 104 may be implemented on a computing device that includes a processor 114 and a memory 116. The web configurator 110 and management component 112 may be stored in the memory 116. In embodiments, the processor 114 executes the web configurator 110 and/or the management component 112 to provide various aspects of the functionality associated therewith. The server 104 may be configured to access, receive, copy, or otherwise obtain information from, or store information in, a memory device 118, which may be implemented on one or more physical devices. The memory device 118 may index stored information using one or more databases 120, 122, and/or 124.

For example, as shown in FIG. 1, information associated with currently available products may be stored in a quoting database 120. Typically, manufacturers, wholesalers, and/or retailers of home improvement products such as windows and doors maintain at least two databases for product information—a first database is used to provide images, representations, and other information about products, to enable a user to select a product to purchase, and a second database is used to provide currently available product information for the purpose of supporting the resulting transaction. Because these databases conventionally are not integrated, the currently available product information may be inconsistent with the product information viewed by the user during product selection. According to embodiments of the invention, a single quoting database 120 (or, multiple connected and/or integrated databases) is used to provide product information for both purposes. As used herein, "currently available" products and/or features refer to products and/or product features, respectively, that are available as of the time that information about the products and/or features is accessed.

As is shown in FIG. 1, the memory device 118 may also include a project database 122. The project database 122 may be configured to store project files associated with users, tasks, quotes, and/or the like. For example, a user may initiate a project session with the system 102, which results in the management component 112 creating a project file associated with that project session and user. The user may browse available products and product features, selecting one or more products and/or product features that are of interest to the user. Upon selection of a product or product feature, the management component may save an indication of that selection in the project file. In this manner, the user can build a project file that includes multiple product and/or product feature options for a given home improvement project. The project session may be configurable by the user. For example, the user may create a new session for each door or window that the user wishes to replace, for a set of doors and/or windows that the user wishes to replace, or according to any other parameters. The project file may be maintained in the project database 122 and the management component 112 may facilitate access to that project file by the user device 106 and/or the portable device.

The memory device 118 also may include a consumer relationship management (CRM) database 124 that may be used to maintain any number of different types of CRM information such as, for example, customer profiles, advertising information, sales analytics, customer accounts consumer information (e.g., passwords, usernames, account permissions, etc.), and/or the like. The web configurator 110 and/or the management component 112 may be configured to interact with the CRM database 124 to manage CRM information.

Any one or more of the databases 120, 122, and 124, each of which may refer to one or more databases, may be, or include, one or more tables, one or more relational databases, one or more multi-dimensional data cubes, and/or the like. Further, though illustrated as single components implemented in the memory device 118, each of the databases 120, 122, and 124 may, in fact, be a plurality of databases 120, 122, and 124, such as, for instance, a database cluster, which may be implemented on a single computing device or distributed between a number of computing devices, memory components, and/or the like.

The system 102 also includes a quoting component 128 and a scheduling component 130. In embodiments, the quoting component 128 may be configured to receive project files from the management component 112, the user device 106, and/or the portable device 108, and to generate product quotes. A product quote may include a combination of an identification of a product and a price associated with that product. According to embodiments, the quoting component 128 is configured to access the quoting database 120 to obtain information about currently available products, including current prices associated with currently available products. A product quote may be a file, a document, a message, and/or the like. For example, the quoting component 128 may receive a project file; parse the project file to detect an identification of one or more products and/or product features; determine, by accessing the quoting database 120, a price associated with one or more of the products and/or product features; and generate a product quote (e.g., a file listing the identified products and/or product features and their associated prices). A product quote may also indicate discounts, quantities of a product or product feature that are available, prices and/or estimates associated with related services (e.g., installation services, repair services, warranty services, etc.), and/or the like. The quoting component 128 may provide the product quote to the management component 112, the user device 106, and/or the portable device 108. Additionally, the quoting component 128 may associate the product quote with a project file, and save the quoting component in a database 120, 122, and/or 124. Product quotes may be updated, edited, deleted, merged, divided, duplicated, and/or the like.

The quoting component 128 may be configured to interact with the scheduling component 130 to facilitate scheduling consumer visits, which may include visits to discuss potential product options, visits to prepare for installation of products, visits to install products, visits to service installed products, and/or the like. The scheduling component 130 may also interact with any other of other components depicted in FIG. 1 such as, for example, the management component 112, the user device 106, and/or the portable device 108. The scheduling component 130 may be configured to access calendar information corresponding to service people (e.g., associates and/or agents of the manufacturer, wholesaler, and/or retailer that hosts the system 102 such as, for example, salespersons, installation technicians, and/or the like).

The scheduling component 130 may automatically schedule appointments based on the calendar information, provide options and/or notifications to the associates and/or agents indicating that appointments need to be scheduled, and/or the The contextual visualization may include a two-dimensional image or a three-dimensional image like. That is, for example, the scheduling component 130 may be configured to interact with a schedule-managing application (e.g., Microsoft Outlook, etc.), an enterprise network, and/or the like, and may be granted any number of different types of permissions, access levels, and/or the like. The scheduling component 130 may be configured to access information about service people to determine appropriate service people for a particular task. That is, for example, the scheduling component 130 may determine, from a product quote and/or project file, whether the service to be scheduled is an installation, a repair, a sales visit, and/or the like.

As is further shown in FIG. 1, the portable device 108 may be implemented on a computing device that includes a processor 132, a memory 134, and an imaging device 140. The imaging device 140 may be any type of digital camera, digital video camera and/or the like, configured to obtain digital images of a scene. The scene may include, for example, a portion of a structure that includes an installation location for installation of a home-improvement product. In embodiments, the portable device 108 may be the user device 106. The processor 132 may be configured to instantiate a visualizer 136, which may be stored in the memory 134. The visualizer may include a graphical user interface (GUI) 138 configured to facilitate interaction with the system 102 to provide a home-improvement shopping experience.

According to embodiments, the visualizer 136 may include an application running on the portable device 108, a client application, an application programming interface (API), a script, a plug-in, and/or the like. The visualizer 136 may be configured to facilitate providing at least a portion of a home-improvement shopping experience and may be configured for use by a consumer and/or a service person. In an illustrative example, a salesperson representing a window manufacturer may take the portable device 108 to a potential consumer's home and, using the visualizer 136, assist the consumer in selecting a window for installation in a particular installation location. To facilitate the consumer's shopping experience, the salesperson may use the imaging device 140 to obtain a digital image of a scene that includes a portion of the consumer's home that includes the installation location. The imaging device 140 may save the digital image in the memory 134. The visualizer 136 may be configured to present a contextual visualization of the installation location, which depicts the installation location having a particular available product installed therein. The contextual visualization may include a two-dimensional image or a three-dimensional image.

The contextual visualization may be generated by the visualizer 136, and/or some component of the system 102. In embodiments, the contextual visualization may be generated by overlaying an image of a selected currently-available product on top of the digital image, merging the images, and/or otherwise manipulating the digital image to depict an installation of the selected currently-available product. The GUI 138 may include one or more menus, controls, options, and/or the like that enable a user (e.g., the salesperson, consumer, etc.) to select different products to view, different product features (e.g., different colors, designs, textures, etc.), and/or the like.

To provide the contextual visualization, the visualizer 136 may be configured, to receive the digital image (e.g., from the imaging device 140, the memory 134, etc.), and present the digital image on a display, via the GUI 138. In embodiments, the GUI 138 may include any number of different interactive capabilities such as, for example, editing tools, measuring tools, selecting tools, and/or other functions that facilitate interaction with the digital image. The visualizer 136 may be configured to determine, based on the digital image of the scene, dimensions of the installation location and to provide the determined dimensions to the system 102. In this manner, for example, a price included in a product quote may correspond to a product feature of a list of currently available product features, the product feature having a dimensional configuration of the first selected product. The dimensional configuration may include a set of dimensions of the selected product such that the first selected product having the dimensional configuration is sized to fit the installation location.

This dimension determination may be performed automatically and/or manually. For example, in embodiments, the visualizer 136 may utilize parameters associated with the digital image (generated by the imaging device 140) to ascertain known dimensions (e.g., based on focal length, image dimensions in the context of focus points and/or regions of interest, etc.) and use the known dimensions to determine the dimensions (e.g., length, width, height, depth, etc.) of the installation location. In embodiments, the visualizer 136 may be configured to utilize a statistical classifier such as, for example, one or more supervised and/or unsupervised machine-learning algorithms, any number of various digital image processing techniques (e.g., edge detection, foreground detection, region of interest detection, etc.), neural networks, and/or the like to determine the dimensions of the installation location. In embodiments, the salesperson (or other user) may select a dimension on the digital image and manually input a known value for that dimension, in which case, the visualizer 136 may determine the unknown dimensions based on the known dimension.

In an illustrative use case, a first user (e.g., consumer) might utilize the user device 106 to create a project file online, via a user interface (UI) 126 provided by the web configurator 110. The UI 126 may be provided via a browser hosted by the user device 106, facilitating an online shopping experience. The user may, for example, provide an input to the web configurator 110 instructing the system 102 to create a new project session, and then may request a list of currently available products. Alternatively, the user may simply request the list of currently available products, in which case, the management component 112 may automatically create a project file in response to receiving an indication of a selection, by the user, of a product or product feature. The user device 106 may communicate with the server 104 to request the list of currently available projects.

As described above, the server 104 may be configured to provide a service, where the service is configured to obtain, from the quoting database 120, the list of currently available products. The currently available products comprise products that are available for purchase as of the time that the server references (e.g., accesses, queries, invokes a hyperlink to, etc.) the quoting database to obtain the list. The server 104 may be further configured to provide, to the user device 106, the list of currently available products, which is presented, by the user device 106, to the user. The consumer may utilize any number of input devices to select, via the GUI 126, a first product, and the server 104 may be configured to receive, from the user device 106, an indication of the first selected product.

In response to receiving the indication of the first selected product (and/or in response to any number of other instructions, indications, commands, function calls, etc.), the server 104 may be configured to create a project file, including an indication of the first selected product, associated with the user and to save the project file in the project database 122. The server 104 may be configured to provide the project file to a quoting component 128, which may be configured to (1) reference the quoting database 120 to determine a current price corresponding to the first selected product; and (2) generate a first product quote, the first product quote including the current price corresponding to the first selected product. The current price may be a price that is valid as of the time that the quoting component 128 references the quoting database 120, and may include a materials price, a delivery price, an installation price, and/or the like. The project file may be updated to include the first product quote, and may be subsequently accessed, edited, updated, and/or deleted by the first user (e.g., by utilizing the user device 106, the portable device 108, etc.).

In the illustrative use case, the portable device 108 might be operated by a second user, who is a salesperson for the entity that maintains the system 102. Upon receiving a request from the first user (or, e.g., automatically in response to updating the project file), the server 104 may interact with the scheduling component 130 to facilitate scheduling an appointment. In this manner, the scheduling component 130 may be configured to receive, from the server 104, an indication of the first product quote; reference calendar information corresponding to at least one representative (e.g., the second user); and schedule, based on the calendar information, an appointment. The appointment may include a sales appointment, an installation appointment, and/or the like, and may be scheduled, in part, using scheduling information submitted by the first user.

At the scheduled appointment time, the second user might visit the property (e.g., home, business, etc.) of the first user. The second user may access the project file, using the portable device 108, so that the second user may discuss the project file, product options, and/or the like, with the first user. In embodiments, the GUI 138 may be configured to interact with the server 104 to facilitate access to the project file. In the illustrative use case, the second user may utilize the visualizer 136 to demonstrate, to the first user, how the first selected product (identified in the project file) would look if installed in the installation location. That is, for example, the second user might obtain a digital image of a scene including the installation location, using the imaging device 140. The installation location may include a location in which a product may be installed and may include, for example, a window location, a door, location, and/or the like. The imaging device 140 may store the digital image in the memory 134.

The portable device 108 and/or the system 102 may be configured to associate the digital image with a project file (e.g., by including the digital image in the project file), and the portable device 108 may provide access to the project file. In embodiments, for example, project files may be maintained in the project database 122 on the system 102. The server 102 may be configured to facilitate access to the project files in the project database 122 by providing copies of project files to the portable device 108, by enabling the portable device to query the project database 122 (e.g., via an application programming interface (API), by providing access to a query component (not shown), etc.), and/or the like.

Figure 2A:
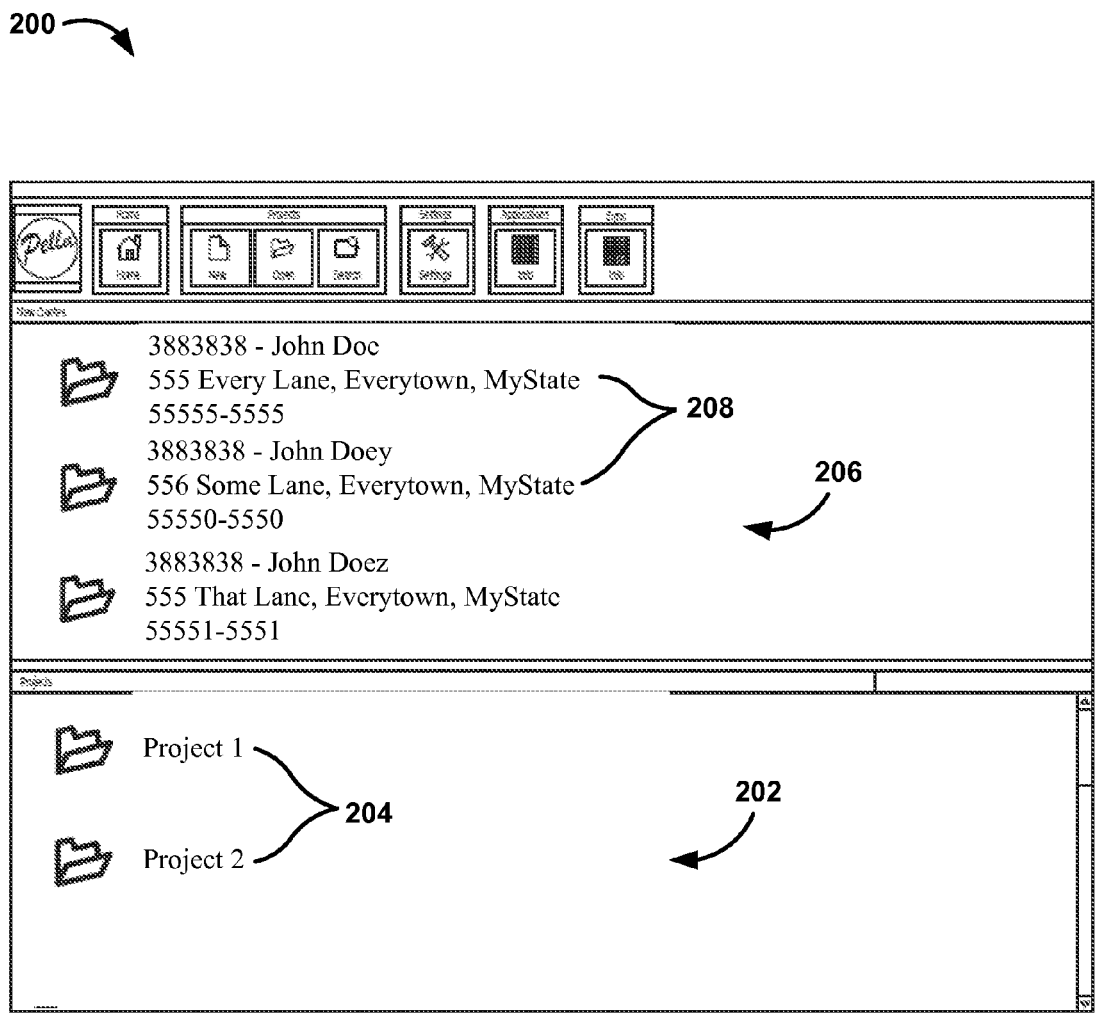
FIGS. 2A-2H depict illustrative screenshots from a visualizer, depicting an illustrative operation related to facilitating a dynamic home-improvement shopping experience, in accordance with embodiments of the disclosure.
Figure 2B:
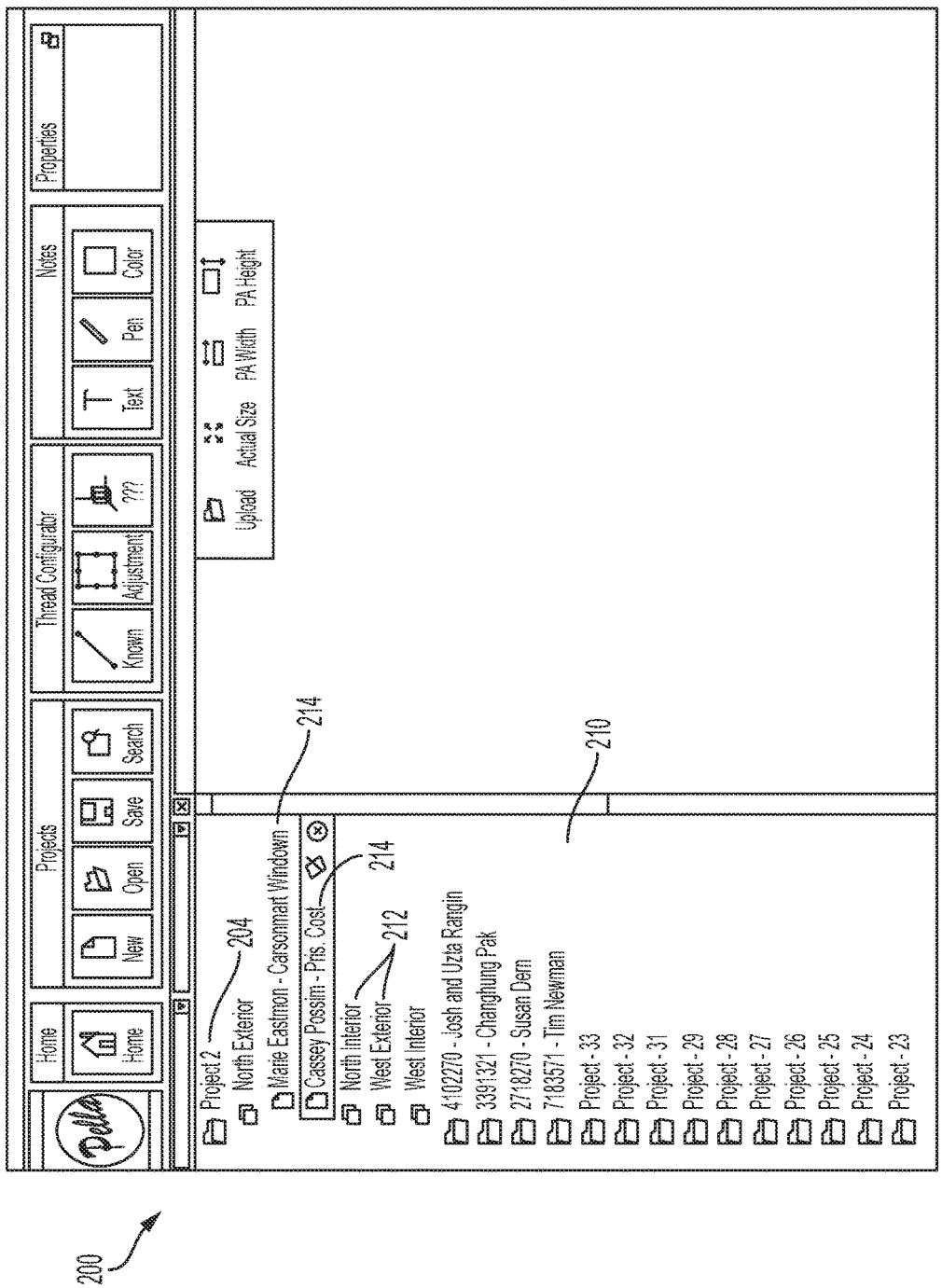

Turning briefly to FIGS. 2A-2H, illustrative screenshots depict an operation of the visualizer 136 in accordance with embodiments of the example use case discussed above. As shown, for example, the second user may cause the portable device 108 to instantiate the visualizer 136, which instantiates a GUI 200 (which may, for example, be the GUI 138 depicted in FIG. 1). As shown in FIG. 2A, the GUI 200 may present a listing 202 of project files 204. In the depicted embodiments, the GUI 200 may also be configured to present a listing 206 of product quotes 208. Upon selection of a project file 204, a menu 210 may be presented to enable navigation within the project file 204, as shown in FIG. 2B. For example, the menu may present representations 212 of different regions of a property associated with the project file 204, and each representation may be selected to present representations 214 of installation locations and/or selected products corresponding to the selected region representation 212.

Figure 2C:
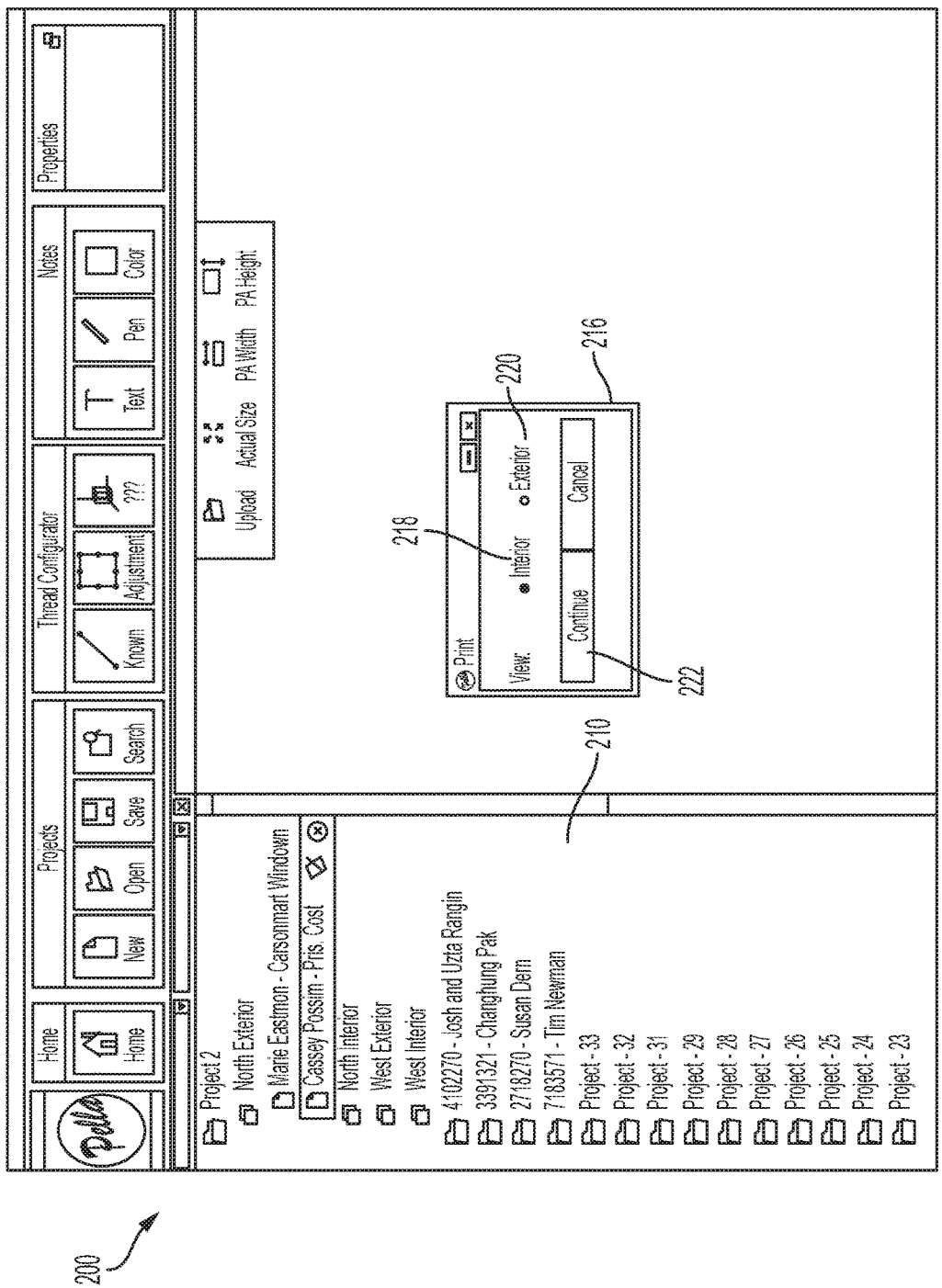
Figure 2D:
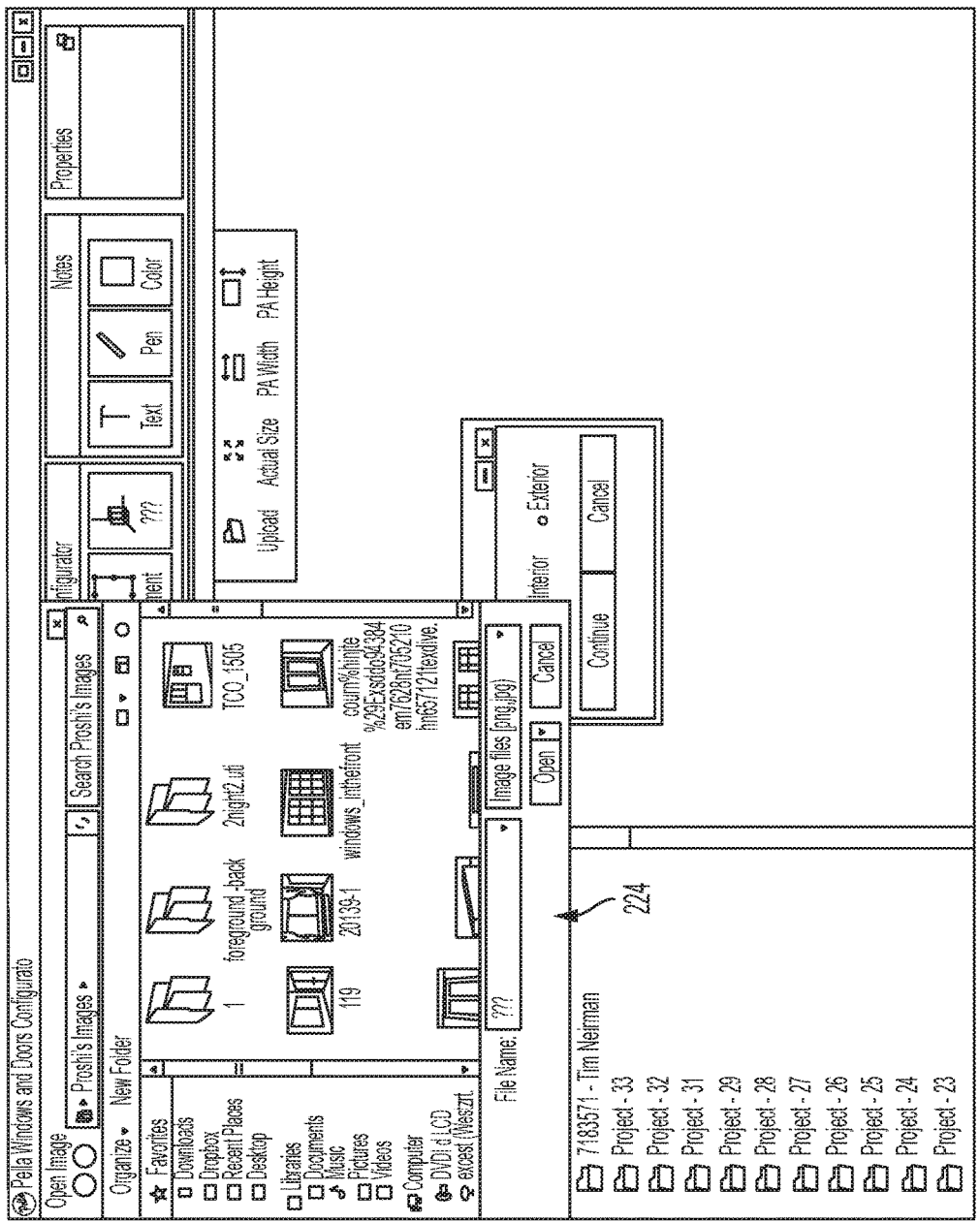

As shown in FIG. 2C, selection of a particular installation location may cause the visualizer 136 to present a dialog box 216 that provides a selectable option 218 for presenting an interior view of the installation location and a selectable option 220 for presenting an exterior view of the installation location. That is, for example, a user (e.g., the first user, second user, and/or some other user) may use an imaging device (e.g., the imaging device 140 to obtain a digital image of a first scene including an interior view of a particular installation location, and a digital image of a second scene including an exterior view of the particular installation location. The two images may be indexed according to the installation location. As shown in FIG. 2C, the second user may select, for example, the selectable option 218 corresponding to the interior view and select an option 222 for continuing. Upon selecting the option 222 for continuing, a folder dialog box 224 may be presented, enabling selection of a particular digital image of a scene corresponding to the interior view, as shown in FIG. 2D.

Figure 2E:
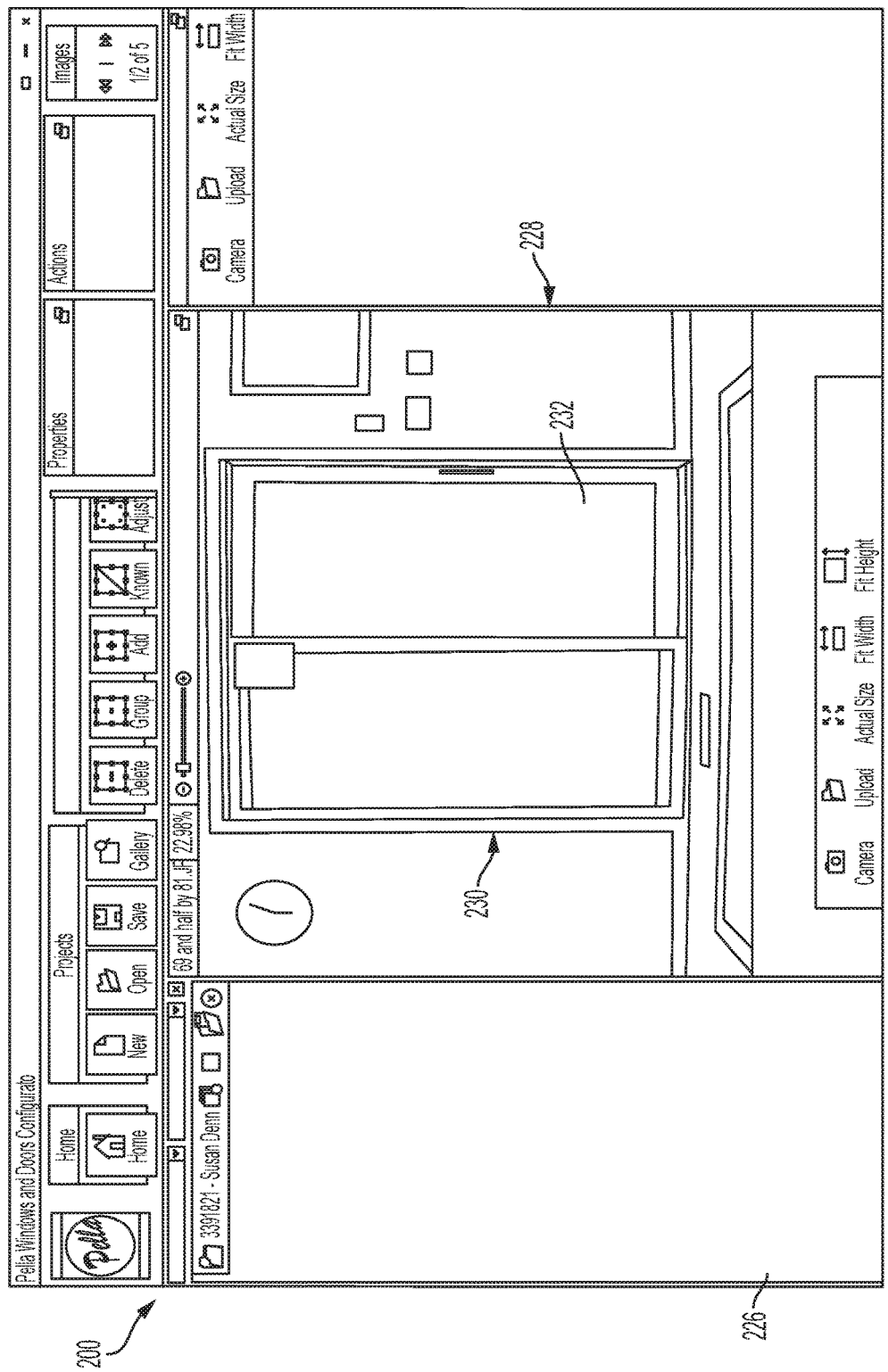

In the example use case, the second user may select a particular digital image, and, upon doing so, the visualizer may present a contextual editor interface 226, which presents the selected digital image 228, as shown in FIG. 2E. The digital image 228 depicts a scene having an installation location 230, which, in the example use case, includes a doorway. As seen in the digital image 228, the installation location 230 has an existing sliding glass door system 232 disposed therein. In this example, the first user may be interested in replacing the existing door system 232, for example.

Figure 2F:
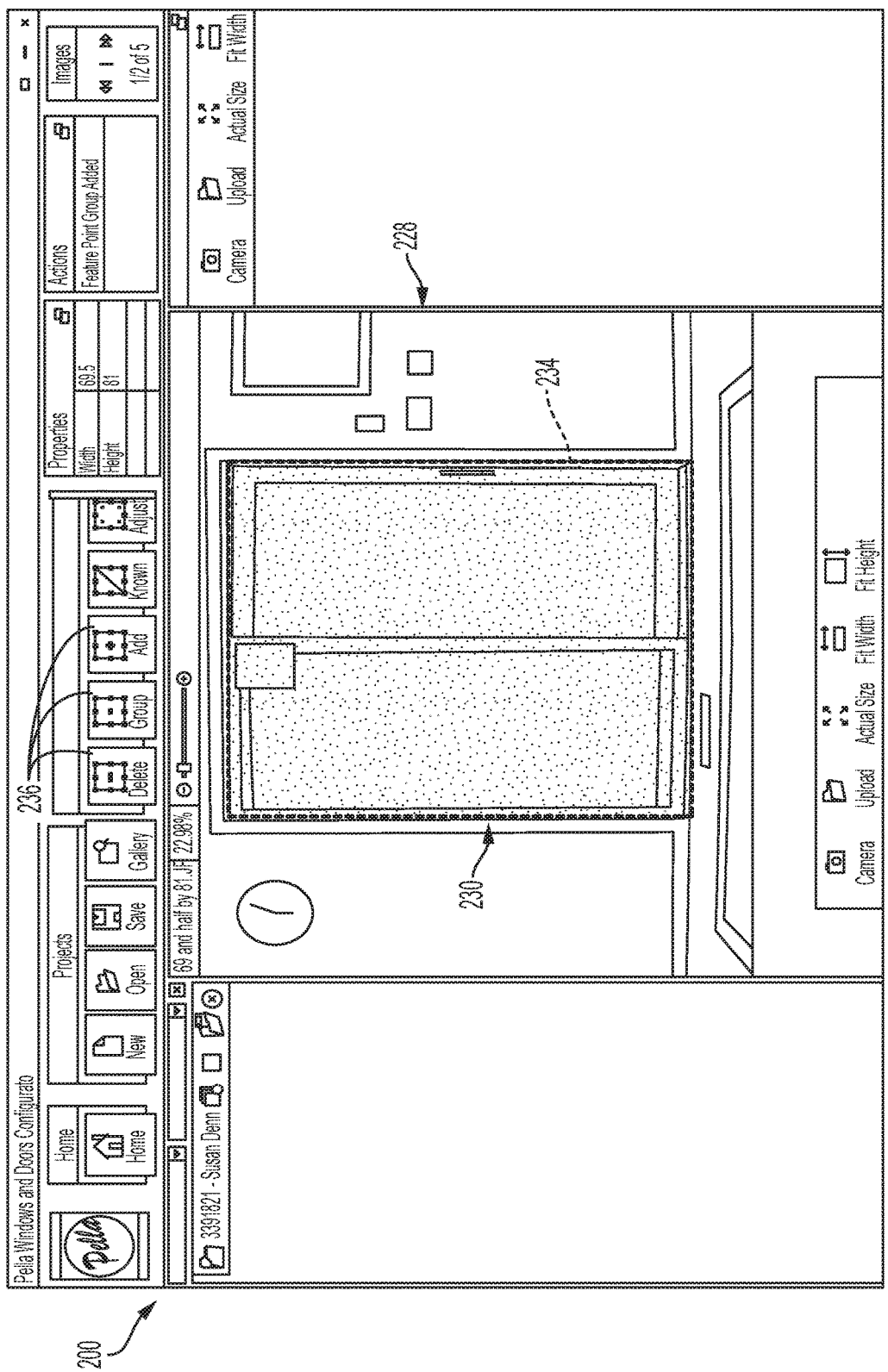

As shown in FIG. 2F, the second user may use a cursor to outline the installation location 230 with a bounding box 234. As shown, the bounding box 234 may be filled with a color, may be opaque, may be transparent, and/or the like. In embodiments, the bounding box 234 may be configured manually, such as, for example, by dragging a side or corner of the box 234 to expand it or contract it. In alternative and/or overlapping embodiments, the bounding box 234 may be configured to automatically fit to the installation location 230. For example, image analysis techniques such as foreground detection, edge detection, background detection, image segmentation, region-of-interest detection, and/or the like, may be utilized by the visualizer 136 to identify the boundaries of the installation location 230, features of the installation location 230, and/or the like. The visualizer 136 may be configured to use the bounding box 234 in any number of different ways, for example, to determine the shape of the installation location 230, determine the size of the installation location 230, to identify the position of the installation location 230 in the digital image 228, and/or the like. As shown in FIG. 2F, the GUI 200 may provide a number of tools 236 for manipulating the bounding box 234. For example, such tools may be configured to enable a user to add regions to a region selected using the bounding box 234, remove portions of the bounding box 234, group multiple bounding boxes 234 to represent a single region, adjust the shape and/or size of an existing bounding box 234, and/or the like. Additionally, as explained previously, the visualizer 136 may be configured to determine dimensions of the actual installation location 230, based on the digital image 228. This determination may be performed entirely automatically or using manual input.

Figure 2G:
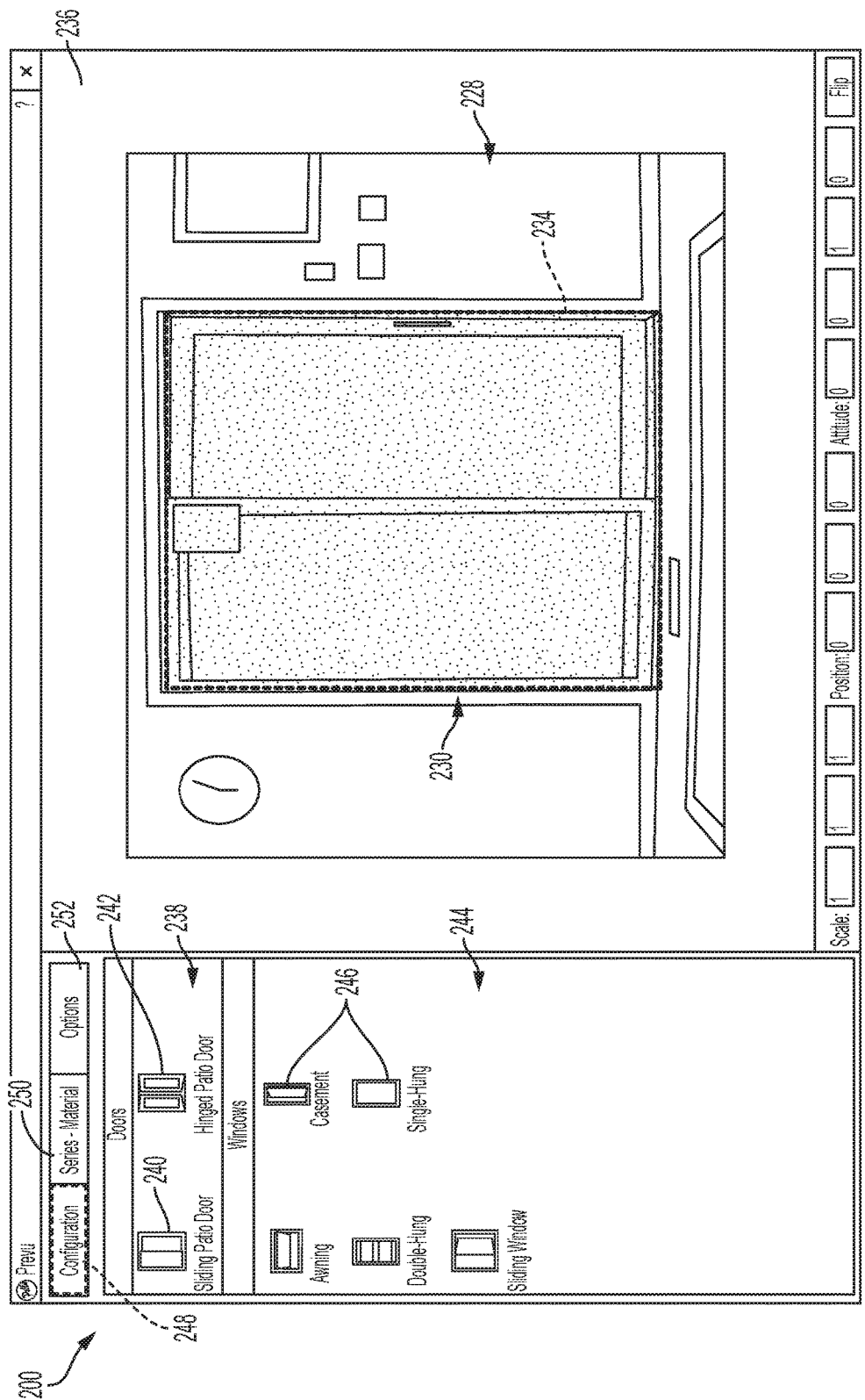

As shown in FIG. 2G, the visualizer 136 may present, via the GUI 200, a list 238 of currently available products 240, 242. The visualizer 136 may also present a list 244 of currently available product features 246. As shown, the currently available product features 246 may correspond to the currently available products 240 and 242. In this manner, the second user may select one of the currently available products and/or one or more of the available product features 246. The currently available product features 246 may include any number of different types of features associated with a product 240 and/or 242 such as, for example, available colors, materials, constructions, embellishments, configurations, and/or the like. In the illustrated screenshot of FIG. 2G, the list 238 of currently available products 240 and 242 include two different types of available doors (a sliding patio door and a hinged patio door), and the list 244 of available product features 246 include configuration options (awning, doube-hung, sliding window, casement, and single-hung). The illustrated GUI 200 also includes selectable options 248, 250, and 252 for changing the types of product features that are displayed.

Figure 2H:
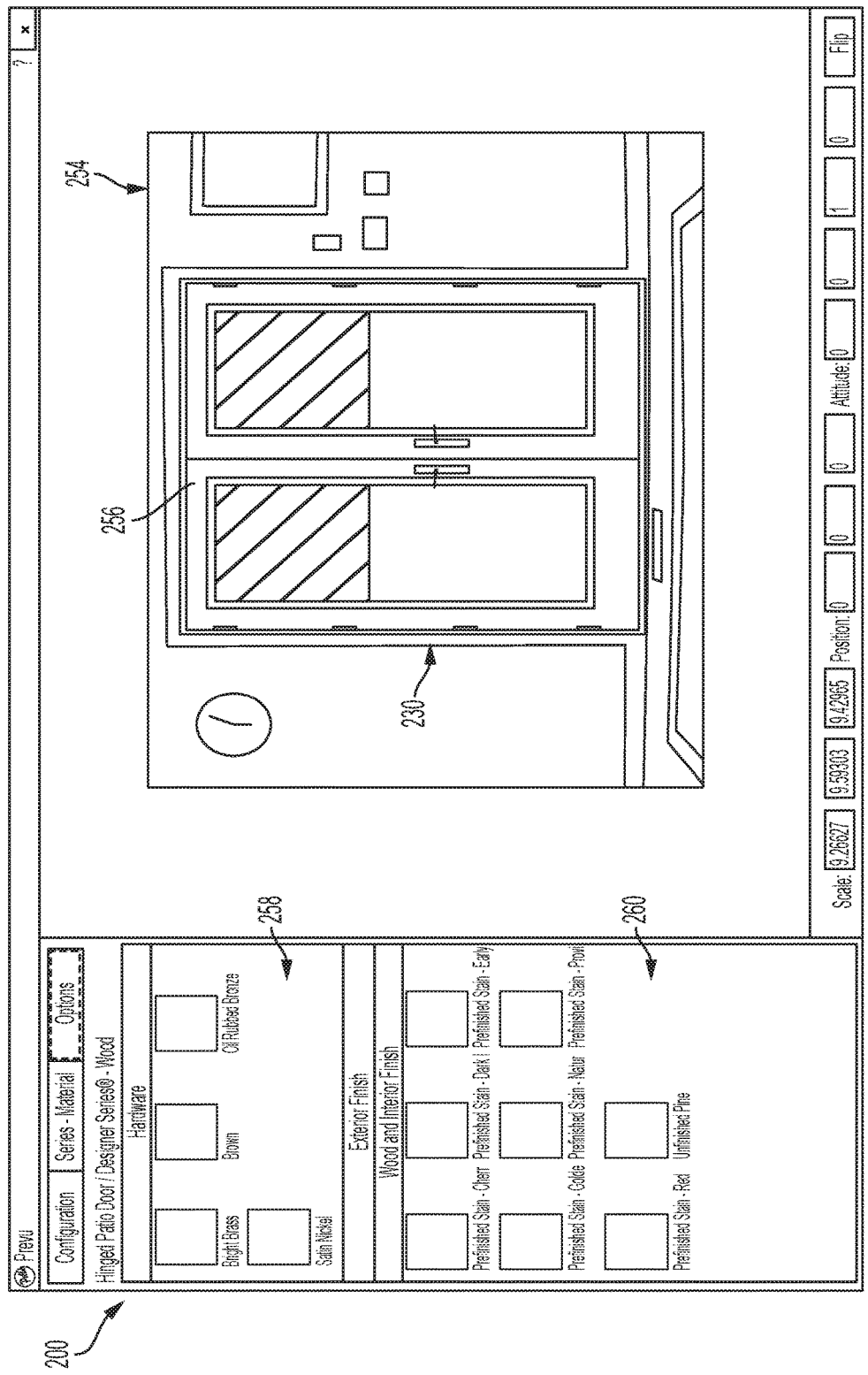

Upon selecting a product 240 or 242 and/or product feature 246, the visualizer may provide an identification of the selection, including dimensions of the installation location 230, to the system 102, which may provide an image of the selected product and/or product feature to the visualizer 136. As shown in FIG. 2H, the visualizer 136 may present a contextual visualization 254, via the GUI 200, of the selected product 256 installed in the installation location 230. The user may interact with lists 258 and/or 260 of available product features to dynamically adjust the appearance of the selected product 256 in the contextual visualization.

In this manner, and with continued reference to FIG. 1, the second user might work with the first user, for example, to select different products, product features, and/or the like, each of which may be presented via a contextual visualization. When the first user decides upon a final product/feature selection, the visualizer 136 may be configured to update the project file (or cause the server 104 to update the project file) with the final selection, and the server 104 may obtain a final product quote from the quoting component 128, and provide the final product quote to the portable device 108 for presentation to the first user. As explained above, the first or second user's acceptance of the final product quote may, for example, cause the server 104 and/or the quoting component 128 to communicate with the scheduling component 130 to schedule installation of the final selected product.

The example use case described above is intended to represent just one of any number of different types of implementations. In embodiments, for example, a customer may utilize the portable device 108. Additionally, the configuration of the system 102 may take any number of different forms and may include, for example, any number of different servers, functions, scripts, application programming interfaces (APIs), memory devices, and/or the like.

According to embodiments, and as indicated above, various components of the operating environment 100, illustrated in FIG. 1, can be implemented on one or more computing devices. For example, each of the system 102, the user device 106, and the portable device 108 may be, or reside in, one or more computing devices. A computing device may include any type of computing device suitable for implementing embodiments of the invention. Examples of computing devices include specialized computing devices or general-purpose computing devices such "workstations," "servers," "laptops," "desktops," "tablet computers," "handheld devices," and the like, all of which are contemplated within the scope of FIG. 1 with reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, memory (e.g., memory 118 and/or 134) includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. In embodiments, the memory (e.g., memory 118 and/or 134) stores computer-executable instructions for causing the processor (e.g., processor 114 and/or 132, respectively) to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the web configurator 110, the management component 112, the visualizer 136, the GUI 126 and/or 138, the quoting component 128, the scheduling component 130, and/or the like. Some or all of the functionality contemplated herein may also, or alternatively, be implemented in hardware and/or firmware.

The illustrative operating environment 100 shown in FIG. 1 is not intended to suggest any limitation as to the scope of use or functionality of embodiments of the presently disclosed subject matter. Neither should the illustrative operating environment 100 be interpreted as having any dependency or requirement related to any single component or combination of components illustrated therein. Additionally, any one or more of the components depicted in FIG. 1 may be, in embodiments, integrated with various ones of the other components depicted therein (and/or components not illustrated), all of which are considered to be within the ambit of the disclosed subject matter.

Figure 3:
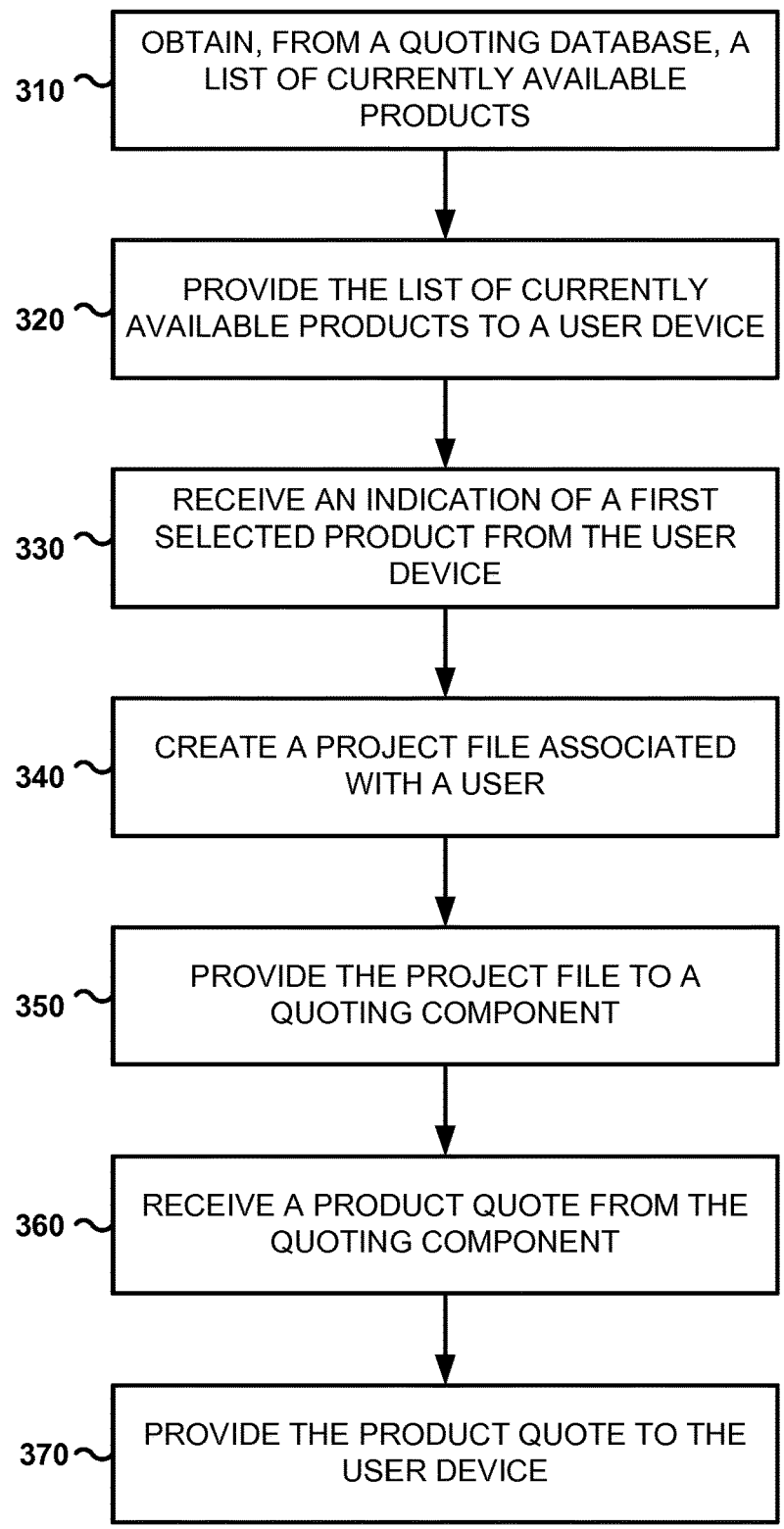
FIG. 3 is a flow diagram depicting an illustrative method of facilitating a dynamic home-improvement shopping experience, in accordance with embodiments of the disclosure.

As described above, embodiments facilitate providing an interactive and assistive home-improvement shopping experience. FIG. 3 is a flow diagram depicting an illustrative method 300 for facilitating a dynamic home-improvement shopping experience. In embodiments, aspects of the method 300 may be performed by a system and/or server (e.g., the system 102 and/or server 104 depicted in FIG. 1), components of the system and/or server (e.g., the management component 112 depicted in FIG. 1), and/or the like. As shown in FIG. 3, embodiments of the illustrative method 300 may include obtaining a list of currently available products from a quoting database (block 310). The currently available products may include products that are available for purchase as of the time that the server obtains the list from the quoting database. The method 300 may also include providing, to a user device, the list of currently available products (block 320). The user device may provide a graphical user interface (GUI) that presents the list of currently available products to a user.

As shown in FIG. 3, the system receives, from the user device, an indication of a first selected product (block 330). The first selected product may include a first product selected, via the first GUI, by the first user from the list of currently available products. The system may create a project file associated with the first user (block 340). The project file may include an indication of the first selected product. Embodiments of the method 300 further include providing the project file to a quoting component (block 350). In embodiments, the quoting component may be configured to reference the quoting database to determine a current price corresponding to the first selected product and to generate a first product quote including the current price corresponding to the first selected product. In embodiments, the current price may include a price that is valid as of the time that the quoting component references the quoting database, and may include, for example, a materials price, a delivery price, an installation price, and/or the like. The system may receive the product quote from the quoting component (block 360) and provide the product quote to the user device (block 370).

Figure 4:
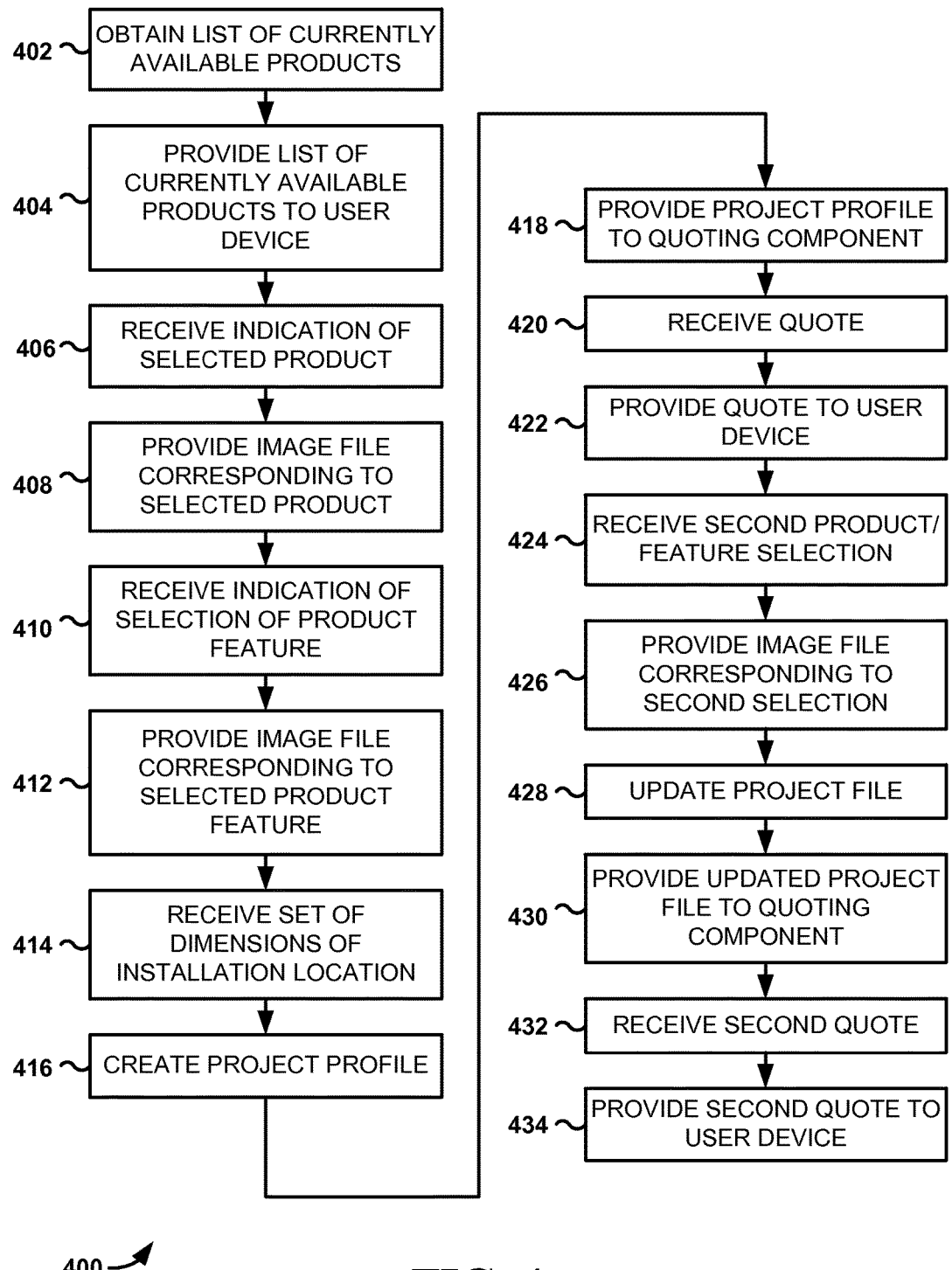
FIG. 4 is a flow diagram depicting another illustrative method of facilitating a dynamic home-improvement shopping experience, in accordance with embodiments of the disclosure.

FIG. 4 is a flow diagram depicting another illustrative method 400 for facilitating a dynamic home-improvement shopping experience. In embodiments, aspects of the method 400 may be performed by a system and/or server (e.g., the system 102 and/or server 104 depicted in FIG. 1), components of the system and/or server (e.g., the management component 112 depicted in FIG. 1), and/or the like. As shown in FIG. 4, embodiments of the illustrative method 400 may include obtaining, from a quoting database, a list of currently available products (block 402). As explained above, the currently available products include products that are available for purchase as of the time that the server references the quoting database to obtain the list.

Embodiments of the method 300 further include providing, to a user device, the list of currently available products (block 404). The user device may be configured to provide a graphical user interface (GUI) that presents the list of currently available products to a user and to receive, from the user, a selection of a product. In embodiments, the method 400 further includes receiving, from the user device, an indication of a first selected product (block 406), where the first selected product is a first product selected, via the first GUI, by the first user from the list of currently available products. The system may provide, to the visualizer, an image file corresponding to the first selected product (block 408). The visualizer may be configured to use the image file corresponding to the first selected product to present a contextual visualization of the first selected product, where the contextual visualization includes an image depicting the first selected product installed in the installation location. Similarly, the system may receive, from the visualizer, an indication of a selection of a product feature (block 410) and may, in response, provide an image file corresponding to the selected product feature to the visualizer (block 412).

Embodiments of the method 400 further include receiving, from the visualizer, a set of determined dimensions of the installation location (block 414). The system may be configured to create a project file associated with the first user (block 416). In embodiments, the project file includes an indication of the first selected product, along with the set of determined dimensions. The system may provide the project file to a quoting component (block 418) and receive, from the quoting component, a product quote (block 420). The quoting component may be configured to (1) reference the quoting database to determine a current price corresponding to the first selected product; and (2) generate a first product quote, the first product quote including the current price corresponding to the first selected product. The price included in the product quote may correspond to a product feature of the list of currently available product features, the product feature including a dimensional configuration of the first selected product. The dimensional configuration may include, for example, a set of dimensions of the first selected product that are selected, based on the determined dimensions, such that the first selected product having the dimensional configuration is sized to fit the installation location.

As shown in FIG. 4, the system may provide the product quote to the user device (block 422). Embodiments of the method 400 may further include receiving, from the visualizer, a selection of at least one of a second product and a product feature (block 424) and providing, to the visualizer, in response to receiving the selection, an image file corresponding to the at least one of the second product and the product feature (block 426). In embodiments, the visualizer may be configured to use the image file corresponding to the at least one of the second product and the product feature to present, in response to receiving the selection of the at least one of the second product and the product feature, a contextual visualization of the at least one of the second product and the product feature. The contextual visualization may include, for example, an image depicting the at least one of the second product and the product feature installed in the installation location.

Embodiments of the method 400 may further include creating an updated project file by updating the project file to include the second selected product/feature (block 428) and providing the updated project file to the quoting component (block 430). The quoting component may be configured to generate a second product quote, the second product quote including a price corresponding to the second selected product/feature, which may be received by the server (block 432) and provided to the user device (block 434).

While embodiments of the disclosed subject matter are described with specificity, the description itself is not intended to limit the scope of this patent. Thus, the inventors have contemplated that the claimed subject matter might also be embodied in other ways, to include different steps or features, or combinations of steps or features similar to the ones described in this document, in conjunction with other technologies.

The following is claimed:

1. A system for facilitating a dynamic home-improvement shopping experience, the system comprising:
   a portable device comprising:
      an imaging device configured to capture a digital image of a scene, wherein the scene comprises a portion of a structure that includes an installation location for installation of a home-improvement product; and
      a processor that instantiates at least one component stored in a memory, the at least one component comprising a visualizer, wherein the visualizer is configured to receive the digital image of the scene from the imaging device; and
   a server communicably coupled to the portable device, the server configured to:
      obtain a list of currently available products from a quoting database, the quoting database comprising the list of currently available products, a list of currently available product features, and at least one current price corresponding to each of the currently available products, wherein the currently available products comprise products that are available for purchase as of the time that the server obtains the list of currently available products from the quoting database;
      provide, to the visualizer, the list of currently available products, wherein the visualizer provides a first graphical user interface (GUI) that presents the list of currently available products to a first user;
      receive, from the visualizer, an indication of a first selected product, wherein the first selected product comprises a first product selected, via the first GUI, by the first user from the list of currently available products;
      create a project file associated with the first user;
      save the project file on a memory device; and
      provide, to the visualizer, an image file corresponding to the first selected product, wherein the visualizer is configured to use the image file corresponding to the first selected product to present a contextual visualization of the first selected product, wherein the contextual visualization comprises an image depicting the first selected product installed in the installation location;
   a scheduling component configured to:
      receive, from the server, an indication of a first product quote;
      reference calendar information corresponding to at least one representative; and
      automatically schedule, based on the calendar information, an appointment or provide a notification to the at least one representative indicating that an appointment needs to be scheduled; and
   a quoting component configured to:
      reference the quoting database to determine a current price corresponding to the first selected product, wherein the current price comprises a price that is valid as of the time that the quoting component references the quoting database; and generate a first product quote, the first product quote comprising the price corresponding to the first selected product, wherein the price comprises at least one of a materials price, a delivery price, and an installation price; and wherein the server is further configured to provide a web service, the web service configured to:

provide a second GUI, the second GUI providing access to the project file to a second user;

receive an indication of at least one of a second selected product and a selected product feature;

create an updated project file by updating the project file to include at least one of a second selected product and a selected product feature;

provide the updated project file to the quoting component, wherein the quoting component is configured to generate a second product quote, the second product quote comprising a price corresponding to the at least one of the second selected product and the selected product feature, wherein the price comprises at least one of a materials price, a delivery price, and an installation price;

receive the second product quote from the quoting component; and provide the second product quote to the second user.

2. The system of claim 1, wherein the visualizer is further configured to:

receive, via the GUI, a selection of at least one of a second product and a product feature; and present, in response to receiving the selection, a contextual visualization of the second selected product and/or the product feature.

3. The system of claim 1, wherein the contextual visualization comprises a three-dimensional image.

4. The system of claim 1, wherein the visualizer is further configured to:

determine, based on the digital image of the scene, dimensions of the installation location; and provide the determined dimensions to the server, wherein a price included in a first product quote corresponds to a product feature of the list of currently available product features, the product feature comprising a dimensional configuration of the first selected product, wherein the dimensional configuration comprises a set of dimensions of the first selected product that are selected, based on the determined dimensions, such that the first selected product having the dimensional configuration is sized to fit the installation location.

5. The system of claim 1, wherein the first user comprises a salesperson and the second user comprises a consumer.

6. The system of claim 1, wherein the scheduling component is further configured to:

determine, from the product quote, whether the service to be scheduled is an installation, a repair, or a sales visit; and access information about service people to determine appropriate service people for the particular service.

* * * * *